F. C. MacDONELL.
FILTER.
APPLICATION FILED JAN. 17, 1916.
1,257,267.
Patented Feb. 19, 1918.
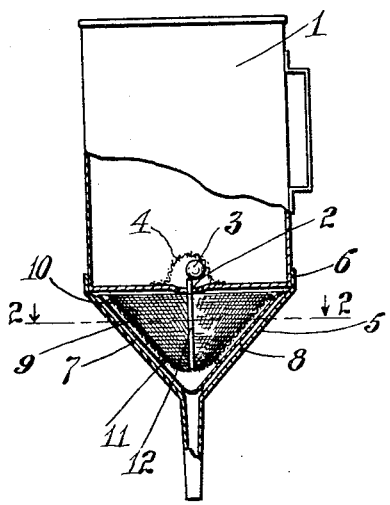
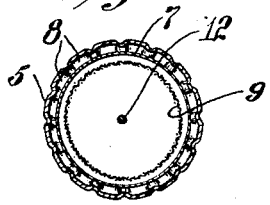
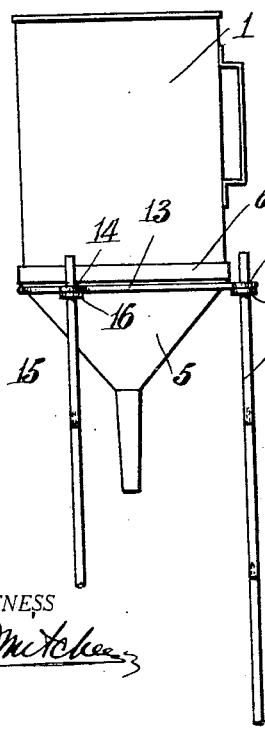
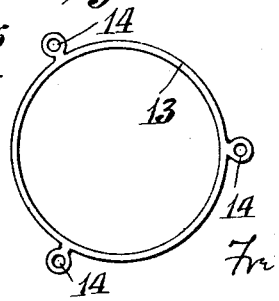
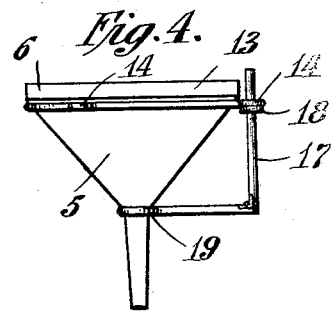
Frederick C. MacDonell
INVENTOR.
BY W. B. Whitney
ATTORNEY

UNITED STATES PATENT OFFICE.

FREDERICK C. MacDONELL, OF NEW YORK, N. Y.

FILTER.

1,257,267.         Specification of Letters Patent.         Patented Feb. 19, 1918.

Application filed January 17, 1916. Serial No. 142,794.

*To all whom it may concern:*

Be it known that I, FREDERICK C. MAC-DONELL, a citizen of the United States, residing in the city of New York, in the county and State of New York, have invented certain new and useful Improvements in Filters, of which the following is a specification.

My invention relates to a filter, of a type adapted for use in those eastern countries in which the people are accustomed to obtain water for washing rice and for cooking purposes by dipping it from the rivers; and the object is to produce a light and inexpensive filter which may be conveniently packed, is readily cleaned and renewed, and will serve efficiently to clarify dirty contaminated water by removing the organic and other solid matters held in suspension therein.

With this end in view, the invention comprises an upper part or can, which is preferably provided with a handle and may be used as a dipper, and, fitting the lower end thereof, a funnel which contains the filtering medium, the bottom of the can being provided with a small outlet opening adapted to allow the water to run down only so fast as it can pass through the filter without clogging. It also includes the other novel features of form, arrangement, and combination of parts hereinafter described and more particularly pointed out in the appended claims.

In the accompanying drawings, which form a part of this specification, Figure 1 is a view, partly in elevation and partly in section, of the preferred form of my improved filter; Fig. 2, a section on the line 2 2 of Fig. 1; Fig. 3, a view, in elevation, showing the filter supported upon a stand; Fig. 4, a similar view of the funnel section of the filter with a detachable handle; and Fig. 5, a detached view of the ring which serves as a part both of the stand and of the handle for the funnel.

Referring to the drawings, the top can 1, made preferably of tin or galvanized iron to hold about two quarts, has in its bottom a small central outlet opening 2 which is provided with a suitable valve, such as the ball 3, and is covered over by a rounded up piece of woven wire 4, serving both as a strainer and as a cage to hold the ball valve in place. The lower funnel part 5, with corrugated sides, has a rim 6 which fits, and by which it is attached to, the lower end of the can; and within this funnel are placed a cone-shaped filter 7, of filter paper, asbestos, or other suitable filtering material, supported if necessary by a backing of wire gauze, which is made more rapid in its action by the open channels 8 provided at its back by the corrugations in the sides of the funnel, and a fine wire strainer 9, also cone-shaped and with a rounded bottom, which is held off the filter by two wire rings 10 and 11. The strainer carries, suitably supported thereby, a small rod 12 which serves, when the funnel is secured in place on the bottom of the can, to raise the ball valve and hold it off its seat in the outlet opening in the bottom of the can. This outlet opening is preferably made of a size, which can readily be ascertained, to permit the water to run from the can down into the funnel only as fast as it can run through the filter.

Each filter is preferably equipped with a wire ring 13 which is provided with three outwardly projecting loops forming eyes 14, three jointed legs 15 each of which has a collar 16 near one end, and a folding handle 17 which has a collar 18 near one end and is bent to form a loop 19 at its other end. The ring is of a size to fit the funnel just below its rim and may be permanently attached thereto if desired. The eyes of the ring provide means for the attachment of cords by which the filter may be carried, or for the insertion of the upper ends of the legs to form a stand or of one end of the folding handle as illustrated in Figs. 3 and 4, respectively.

The funnel, with its contents, as well as the jointed legs and hinged handle, can be packed within the can.

Having explained the principle of my invention and described what I consider to be the best form for the embodiment thereof, what I claim as new, and desire to secure by Letters Patent, is—

1. A filter comprising, in combination, a can provided with a handle and having a small outlet opening in its bottom and, detachably telescoped to the lower end of the can, a funnel containing a cone-shaped filter fitting its tapering walls and a conical strainer supported within and out of contact with the filter, the outlet opening in the bottom of the can being of a size adapted to allow the water to run through only so fast as it can pass through the filter.

2. A filter comprising, in combination, a can provided with a handle and having a small outlet opening in its bottom and, detachably telescoped to the lower end of the can, a funnel with corrugated sides containing nested therein a cone of wire gauze fitting within and supported by its corrugated tapering sides, a cone-shaped filter fitting within and supported by the cone of wire gauze, and a strainer supported within and out of contact with the filter.

3. A filter comprising a can having a valved outlet opening in its bottom, a funnel adapted to be secured to the bottom of the can and containing nested therein a strainer and a filtering medium, and means carried by the strainer and operative when the funnel is secured in place on the can to raise the valve from the outlet opening.

4. In combination, a can provided with a handle and having a valved outlet opening in its bottom, a funnel with corrugated sides adapted to be secured to the lower end of the can and containing nested therein a strainer and a filtering medium, and a rod supported by the filter and adapted when the funnel is secured in place on the can to raise the valve from the outlet opening.

5. In combination, a can having an outlet opening in its bottom, a funnel containing a filtering medium adapted to be secured to the lower end of the can, a ring fitting the outside of the funnel near its upper end and provided with a plurality of eyes, and a plurality of rods with collars adapted to fit into the eyes of the ring.

FREDERICK C. MacDONELL.

Copies of this patent may be obtained for five cents each, by addressing the "Commissioner of Patents, Washington, D. C."